March 3, 1942.         W. G. LOWRY              2,275,190
                 WATER MAIN CLEANING DEVICE
           Filed March 18, 1940         2 Sheets-Sheet 1
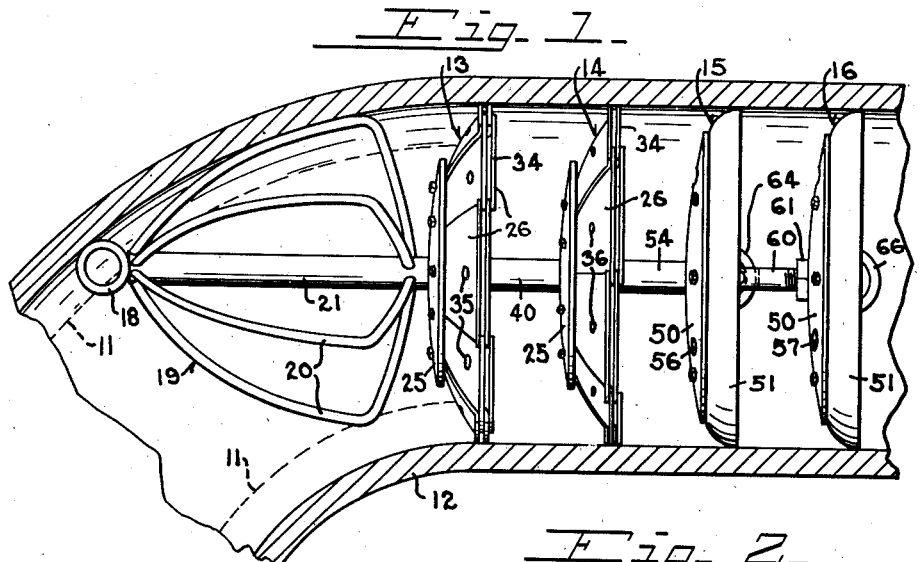
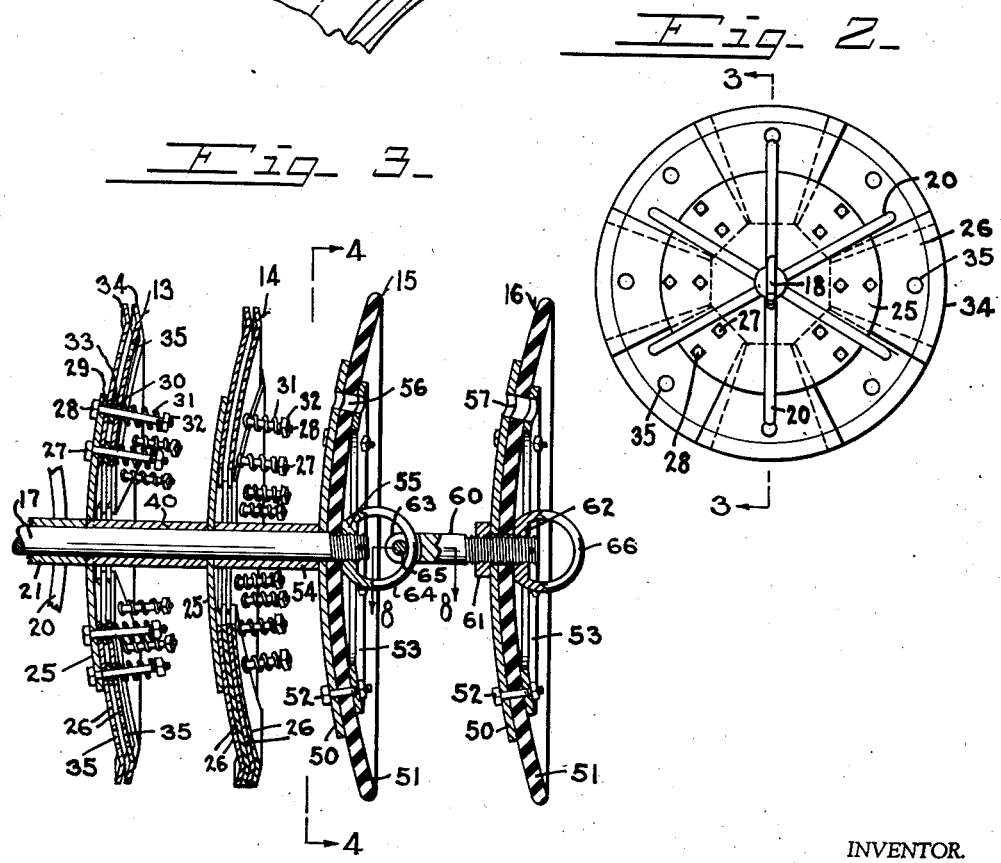
INVENTOR.
WILLIAM G. LOWRY.
BY
H. C. Karl.
ATTORNEY.

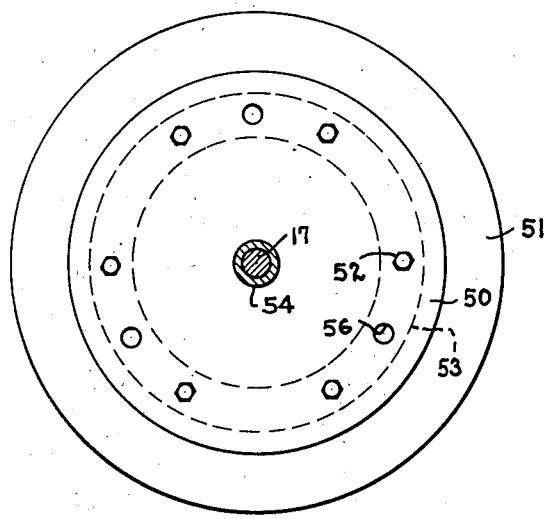
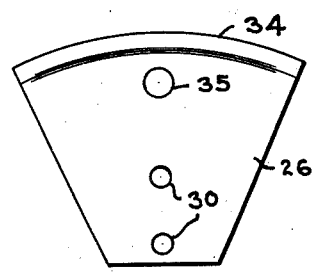
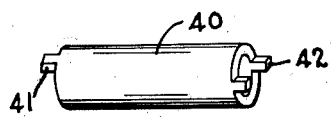
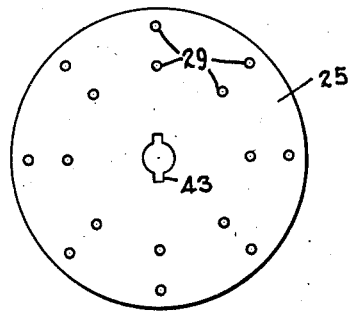
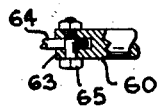

Patented Mar. 3, 1942

2,275,190

UNITED STATES PATENT OFFICE 2,275,190

WATER MAIN CLEANING DEVICE

William G. Lowry, Cincinnati, Ohio

Application March 18, 1940, Serial No. 324,561

3 Claims. (Cl. 15—104.06)

This invention relates to a device which is expressly, but not necessarily only, adapted for conveniently and expeditiously removing deposits and tuberculations from the interior walls of water mains.

It is a matter of common knowledge that various types of deposits and tuberculations form on the interior walls of water mains, causing a decrease in the efficiency of the mains by reducing their areas and causing additional frictional resistances to flow. Various means and appliances have been devised for removing said deposits and tuberculations.

The present invention relates to a device which is susceptible of convenient and dependable usage in scraping the deposits and tuberculations from the inside perimeter of water mains in a practical, simple and economical manner.

The novelty is predicated upon a simple and efficient tool or implement which is capable of ready insertion and removal, upon the opening of a relatively small segment of main, and characterized by a novel arrangement of mechanical parts closely allied and co-operating in such a manner as to perform this otherwise unreliable task in a more satisfactory and acceptable manner.

The object of my invention is to provide a unit structure for cleaning water mains propelled by the water pressure in the main.

A further object is to provide the unit structure with yieldable overlapping cleaning or scraping members held against the inner periphery of the main for thoroughly scraping the interior of the main, but yieldable to pass fixed obstructions protruding into the main.

My invention will be further readily understood from the following description and claims, and from the drawings, in which latter:

Fig. 1 is a plan view of the device, shown in cleaning position in a portion of a water main.

Fig. 2 is a front end view of the device.

Fig. 3 is a sectional detail of the cleaning and propelling units, taken in the plane of the line 3—3 of Fig. 2.

Fig. 4 is a sectional view, taken in the plane of the line 4—4 of Fig. 3.

Fig. 5 is a plan view of one of the scraping members.

Fig. 6 is a perspective view of the lugged separator tube.

Fig. 7 is a detail view of one of the discs supporting the scraping members, and;

Fig. 8 is a detail section of the pivotal joint, taken in the plane of the line 8—8 of Fig. 3.

My improved device comprises a series of elements coacting together to form an efficient water main cleaning device for removing deposits or tuberculations indicated by the dotted line 11, in Fig. 1, from the watermain 12.

The device comprises cleaning units 13 and 14, and a pair of propelling units 15 and 16. The units 13, 14 and 15, are mounted on a shaft 17 having a ring 18 at the forward end thereof. A guide member 19 is received over the shaft 17 adjacent to the ring 18 and comprises a series of curved arms 20 suitably welded to the central hub 21. These arms are so shaped to guide or carry the cleaning units around bends in the main, so that the cleaning units will be at all times in the proper contact with the interior walls of the water main.

The cleaning unit 13 comprises a disc 25 received over the shaft 17 and carries overlapping cleaning disc segments 26, which are held in pairs by means of bolts 27 and 28 received through apertures 29 in the disc 25 and apertures 30 in the segments. The segments are maintained against the disc 25 by means of springs 31 received about the bolts between the segments and nuts 32. Spacing collars 33 are received over the bolts between each pair of segments. Each succeeding pair of segments overlap the adjacent pair of segments. The edges 34 of the segments are sharpened and bent forward to form scraping faces. The apertures 30 are larger than the bolts to permit the segments to yield on the bolts, so that the composite segments will yield and conform to the interior periphery of the water main. The segments are further provided with holes 35, the purpose of which will be apparent as the description progresses.

The scraping unit 14 is similar in construction to the unit 13, with the exception that the holes 36 in the segments are smaller than the holes 35 in the unit 13.

The two units 13 and 14 are spaced apart by a sleeve 40 received over the shaft 17 and provided with lugs 41 and 42 at the respective ends for engagement with keyways 43 in the discs 25 to maintain the units 13 and 14 in a definite radial relation to each other, with the ends of the sleeve abutting the discs, and to maintain the segments on one disc in staggered relation to the segments on the other disc.

The pusher units 15 and 16 are identical in construction, comprising curved discs 50 to which rubberized discs 51 are secured as by bolts 52 received through the discs 50, the rubberized discs 51 and metal rings 53. The assembled unit 15 is received over the shaft 17 and spaced from the cleaning unit 14 by a sleeve 54. A nut 55 is threaded to the shaft 17 to lock the entire assembly of the guide member 19, units 13 and 14, and the pusher unit 15 to the shaft. The unit 15 is provided with a plurality of holes 56 and the unit 16 is provided with a plurality of holes 57 of greater diameter than the holes 56.

The unit 16 is clamped on a shaft 60 by means of nuts 61 and 62. One end of the shaft 60 is provided with a yoke 63 received over a ring 64 extending from the nut 55 with a bolt 65 extending through the yoke to form a pivotal connection between the shaft 17 and the shaft 60. The nut 62 also has a ring 66 secured thereto.

To clean a water main with my improved device the water pressure is turned off and the main is opened at two separate locations. The device is placed in the main in the direction of the flow. The opening through which the device was inserted is then repaired. The water pressure is turned on and as it contacts the pusher unit 16 it causes the device to move forward with a quantity of water under pressure feeding through the apertures 57 for creating a pressure against the unit 15. The apertures 56 in the unit 15 permits a reduced quantity of water to pass on to the cleaning unit 14, which aids the springs 31 in maintaining the segments against the wall of the water main. The apertures 36 permit a quantity of water to escape into the pocket between the cleaning units 14 and 13, so that as the cleaning unit 14 scrapes the wall of the main the deposits or tuberculations will be mixed with the water and pass through the apertures 35 in the cleaning unit 13 to be carried in advance of the cleaning device to the second opening in the main, where the excess water and deposits are discharged. Thus it will be seen that as the device progresses through the main, water is fed to the cleaning units and such deposits or tuberculations as are not removed by the unit 13 will be removed by the unit 14. The loosened deposits mix with the water forming a surging fluctuating emulsion of water and deposits moving ahead of the device as it progresses through the main.

The device is capable of negotiating long stretches of a given size of water main, through valves, T's, Y's, crosses, forty-five degree bends, ninety degree bends and S bends, cleaning the main as it progresses. The component parts are sufficiently flexible to permit the device to pass unusual obstructions in the water main, such as extending plugs or valve stems, which may protrude into the main as much as one-eighth the diameter of the main.

The ring 66 is a cable attaching means which permits a tag-line cable to be attached thereto as a means of determining the progress of the device through the water main, the cable feeding through a small hole in the main at the point of insertion of the device. Interference with the forward progress of the device through the main will be apparent on the tag-line and the tag-line affords a means of pulling the device backward. This is made possible by the fact that the design permits the scraper segments to fulcrum over the edge of their supporting discs into a position which offers relatively small resistance to the removal of the device. The ring 18 is for the purpose of attaching a cable to pull the device through the main in the event of insufficient water pressure.

It will be apparent that different sized units will be required for water mains of larger or smaller diameter, and for each size of main a different sized device will be used.

Having thus fully described my invention, what I claim as new and desire to secure by Letters Patent, is:

1. A water main cleaning device comprising a shaft, a disc mounted on said shaft, a plurality of studs extending from said disc, a plurality of segment cleaning blades mounted on said studs, tension means for normally maintaining said blades against said disc, said blades overlapping each other adjacent the scraping edge, and a piston for propelling said device through a water main.

2. A water main cleaning device comprising a shaft, a disc mounted on said shaft, a plurality of rigid segment cleaning blades flexibly connected to said disc and having the outer edges of said blades overlapping the adjacent blade, and a flexible piston for propelling said device through a water main.

3. A water main cleaning device comprising a shaft, a guide on said shaft, a pair of spaced apart discs rigidly mounted on said shaft, studs extending from said discs, a plurality of pairs of segment cleaning blades flexibly mounted on said studs, each pair of blades overlapping the adjacent pair of blades at the cleaning edge, and the blades on the second disc being staggered in relation to the blades on the first disc.

WILLIAM G. LOWRY.